United States Patent
Carr et al.

(10) Patent No.: US 7,526,374 B2
(45) Date of Patent: Apr. 28, 2009

(54) ETHANOL COMPENSATED FUEL DENSITY FOR FUEL CONSUMED CALCULATION

(75) Inventors: Mark D. Carr, Fenton, MI (US); Louis A. Avallone, Milford, MI (US); Michael J. Svestka, Waterford, MI (US); Kevin J. Storch, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 231 days.

(21) Appl. No.: 11/685,928

(22) Filed: Mar. 14, 2007

(65) Prior Publication Data

US 2008/0223453 A1  Sep. 18, 2008

(51) Int. Cl.
*G06F 19/00* (2006.01)
*F02M 51/00* (2006.01)
*G01F 9/00* (2006.01)
*G01N 11/00* (2006.01)

(52) U.S. Cl. .............. 701/104; 123/1 A; 123/494; 73/114.38; 73/114.48; 702/50

(58) Field of Classification Search ............... 123/1 A, 123/494; 701/101–105, 113, 115; 73/61.43, 73/114.38, 114.48; 702/45, 50, 55, 137
See application file for complete search history.

(56) References Cited

U.S. PATENT DOCUMENTS

| 4,974,552 | A | * | 12/1990 | Sickafus | 123/1 A |
| 5,850,824 | A | * | 12/1998 | Seitz et al. | 123/1 A |
| 5,881,703 | A | * | 3/1999 | Nankee et al. | 123/1 A |
| 5,901,671 | A | * | 5/1999 | Huff et al. | 123/1 A |
| 6,041,278 | A | * | 3/2000 | Kennie et al. | 701/103 |
| 6,257,174 | B1 | * | 7/2001 | Huff et al. | 123/1 A |

FOREIGN PATENT DOCUMENTS

| JP | 01247729 A | * | 10/1989 | 123/480 |
| JP | 03242457 A | * | 10/1991 | 123/478 |
| JP | 05340286 A | * | 12/1993 | 123/472 |

* cited by examiner

*Primary Examiner*—Willis R Wolfe, Jr.

(57) ABSTRACT

An engine control module determining an alcohol compensated fuel consumption value includes an alcohol percent module that determines an alcohol percent in fuel and a fuel mass module that determines a mass of the fuel. The engine control module also includes a fuel volume module that calculates a volume of the fuel based on the mass of the fuel, a density of the fuel, and the alcohol percent.

18 Claims, 3 Drawing Sheets

ETHANOL COMPENSATED FUEL DENSITY FOR FUEL CONSUMED CALCULATION

FIELD

The present disclosure relates to engine systems, and more particularly to a system and method for estimating fuel consumption that compensates for the fuel ethanol percent.

BACKGROUND

The statements in this section merely provide background information related to the present disclosure and may not constitute prior art.

Flexible fuel vehicles (FFVs) are designed to run on a variety of fuels, for example: gasoline, alcohol/gasoline blends, such as 85% ethanol (E85), or a combination of gasoline and alcohol/gasoline blends that result in a random fuel alcohol percent. An engine operating on an alcohol/gasoline blend requires an increased amount of fuel in an air-to-fuel (A/F) ratio compared to gasoline at stoichiometry. For instance, at stoichiometry, the E85 A/F ratio is near 9:1, while gasoline's A/F ratio is near 14.5:1.

Traditionally, "fuel consumed" and "average fuel economy" data are displayed in many vehicles on a Driver Information Center (DIC). Fuel consumption volume may be determined by dividing the mass of fuel consumed by its density. In the past it has been possible to use a fixed fuel density value to calculate the consumption of fuel due to the narrow range of possible density values available. Traditionally, an average fuel density of approximately 735,000 mg/liter was used regardless of the density of the fuel actually being consumed. However, calculating fuel consumption for FFVs based on an average fuel density of gasoline, may result in inaccurate fuel consumption values because the density of ethanol is 8-10% higher than gasoline.

When a driver refuels an FFV, fuel alcohol percent may change significantly with the addition of new fuel. For example, E85 or gasoline may be introduced into a fuel tank containing gasoline or some alcohol/gasoline blend, potentially resulting in a new fuel alcohol percent. A change in the fuel alcohol percent results in a change in fuel density. Using a fixed fuel density suitable for either gasoline or E85 may lead to an underestimated or overestimated average fuel economy value. For instance, a fuel density set for E85 will result in an overestimated average fuel economy when the engine is operating on lower density gasoline, and a fuel density set for gasoline will result in an underestimated average fuel economy when the engine is operating on higher density E85. Further, neither will be accurate when the alcohol/gasoline blend is somewhere between 100% gasoline and 100% E85.

SUMMARY

An engine control module determining an ethanol compensated fuel consumption value includes an alcohol percent module that determines an alcohol percent in fuel and a fuel mass module that determines a mass of the fuel. The engine control module also includes a fuel volume module that calculates a first volume of fuel based on the mass of the fuel, the fuel density and the alcohol percent of the fuel.

The fuel volume module may also add the first fuel volume to a second volume of fuel that is an accumulated volume of the fuel. The fuel volume module generates a fuel consumed value and an average fuel economy value for a DIC based on the first fuel volume and the second fuel volume.

A method of measuring a first volume of fuel consumed in an engine includes determining a mass of fuel consumed by the engine, and determining an alcohol percent in fuel. The method calculates the first volume of fuel based on fuel mass, a density of the fuel and the alcohol percent.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
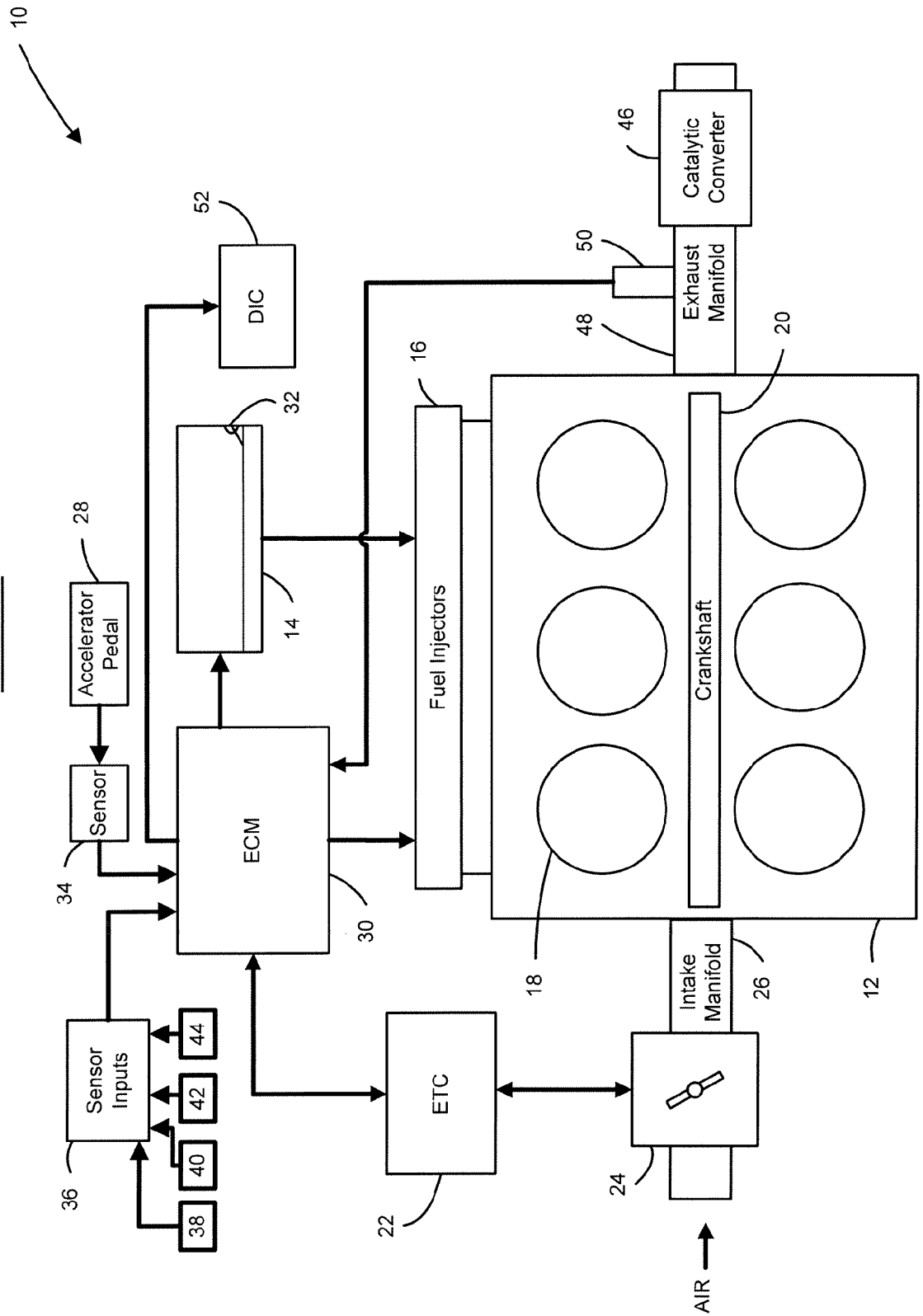
FIG. 1 is a schematic of a vehicle having an engine control module calculating fuel consumption according to the present disclosure.

The following description of the preferred embodiment is merely exemplary in nature and is in no way intended to limit the present disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 is schematically illustrated. The vehicle 10 may be fueled with gasoline and/or an alcohol/gasoline blend in various alcohol percentages. The alcohol may be ethanol. Fuel is delivered to an engine 12 from a fuel tank 14 through a plurality of fuel injectors 16. The engine 12 includes a plurality of cylinders 18 that receive fuel from the fuel injectors 16 to drive a crankshaft 20.

An electronic throttle controller (ETC) 22 adjusts a throttle plate 24 that is located adjacent to an inlet of an intake manifold 26 based upon a position of an accelerator pedal 28 and a throttle control algorithm that is executed by an engine control module 30. The position of the throttle 24 provides an output torque command.

A fuel sensor 32 senses a level of fuel in the tank 14 and communicates the fuel level to the control module 30. Air is delivered to the engine 12 through the intake manifold 26. Vapor from the fuel tank 14 may be collected and delivered to the intake manifold 26 and burned in engine cylinders 18 as well. The control module 30 controls operation of fuel injectors 16 and an ignition system (not shown). The control module 30 also is connected with an accelerator pedal sensor 34 that senses a position of the accelerator pedal 28 and sends a signal representative of the pedal position to the control module 30. Other sensor inputs collectively indicated by reference number 36 and used by the control module 30 include a signal 38 indicating engine speed, a vehicle speed signal 40, an intake manifold pressure signal 42 and a throttle position signal 44.

A catalytic converter 46 receives exhaust from the engine 12 through an exhaust manifold 48. An oxygen sensor 50 senses exhaust in the manifold 48 and delivers signals to the control module 30 indicative of whether the exhaust is lean or rich. The signal output of the oxygen sensor 50 is used by the control module 30 as feedback in a closed-loop manner to regulate fuel delivery to the engine 12 via the fuel injectors 16.

The control module 30 may in part use the exhaust sensor 50 feedback, and the fuel alcohol percent to drive an actual air-to-fuel ratio to a desired value, usually around a stoichiometric value. A plurality of predefined engine operating regions are referred to by the control module 30 in controlling fuel delivery to the engine 12. Operating regions may be defined, for example, based on speed, the load of the engine 12 and/or the fuel ethanol percent. The control module 30 may perform control functions that vary, dependent on which operating region of the vehicle is currently active.

A Driver Information Center 52 (DIC) may be periodically provided with an updated fuel consumed and an updated average fuel economy data by the control module 30. With an estimated or a measured alcohol percent, the control module 30 may determine fuel density and generate updated, alcohol compensated fuel consumed and average fuel economy values for the DIC 52.

Figure 2:
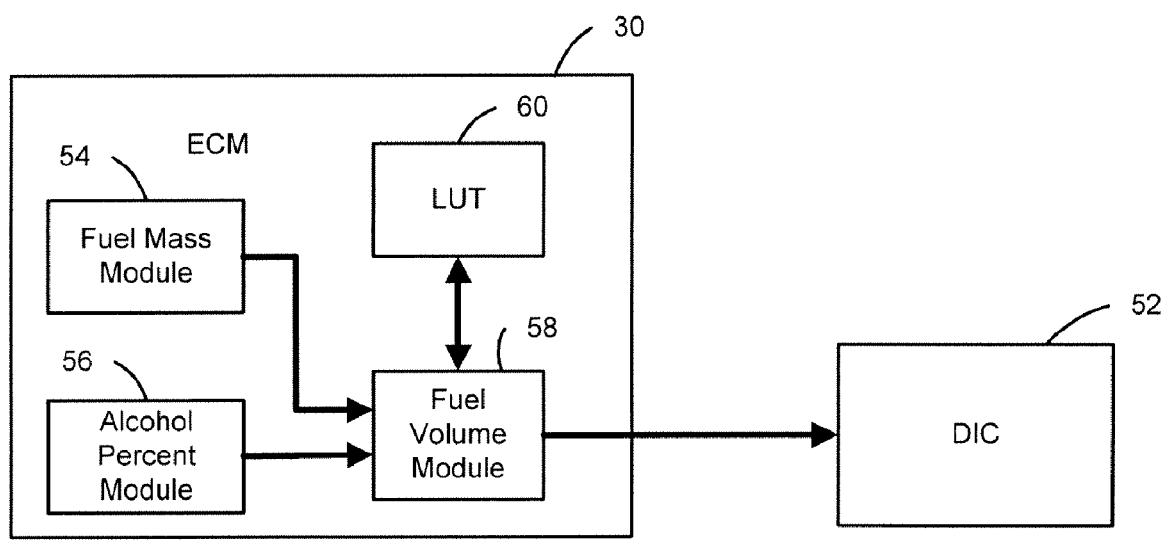
FIG. 2 is a diagram of an engine control module operable to perform consumption of fuel calculation according to the present disclosure.

Referring now to FIG. 2, some elements of the engine control module 30 are shown. The engine control module 30 includes a fuel mass module 54 that periodically determines a mass of fuel delivered to the fuel injectors 16. An alcohol percent module 56 periodically determines an alcohol percent in the fuel delivered to the fuel injectors 16. The alcohol percent module 56 may estimate the current alcohol percent or measure it directly. A fuel volume module 58 receives the fuel mass value generated by the fuel mass module 54 and the updated alcohol percent value generated by the alcohol percent module 56. A look-up table 60 returns an estimated fuel density value to the fuel volume module 58 based on the updated fuel ethanol percent. The fuel volume module 58 stores the updated, estimated fuel density value. A preferred embodiment of look-up table 60 uses the following table:

| Ethanol Percent | Density (mg/liter) |
| --- | --- |
| 0 | 730,000 |
| 10 | 730,000 |
| 20 | 735,000 |
| 50 | 750,000 |
| 80 | 780,000 |

The fuel volume module 58 calculates an alcohol compensated volume of fuel consumed. The volume of fuel consumed is calculated by dividing the fuel mass value by the updated fuel density value. The fuel volume module 58 adds the volume of fuel consumed to an accumulated volume of fuel consumed to calculate an updated accumulated volume of fuel consumed. The fuel volume module 58 stores the updated accumulated volume of fuel consumed. The fuel volume module 58 calculates an average fuel economy value based on the updated volume consumed and updated accumulated volume values. The updated fuel consumed and updated average fuel economy values are transmitted to the DIC 52.

Figure 3:
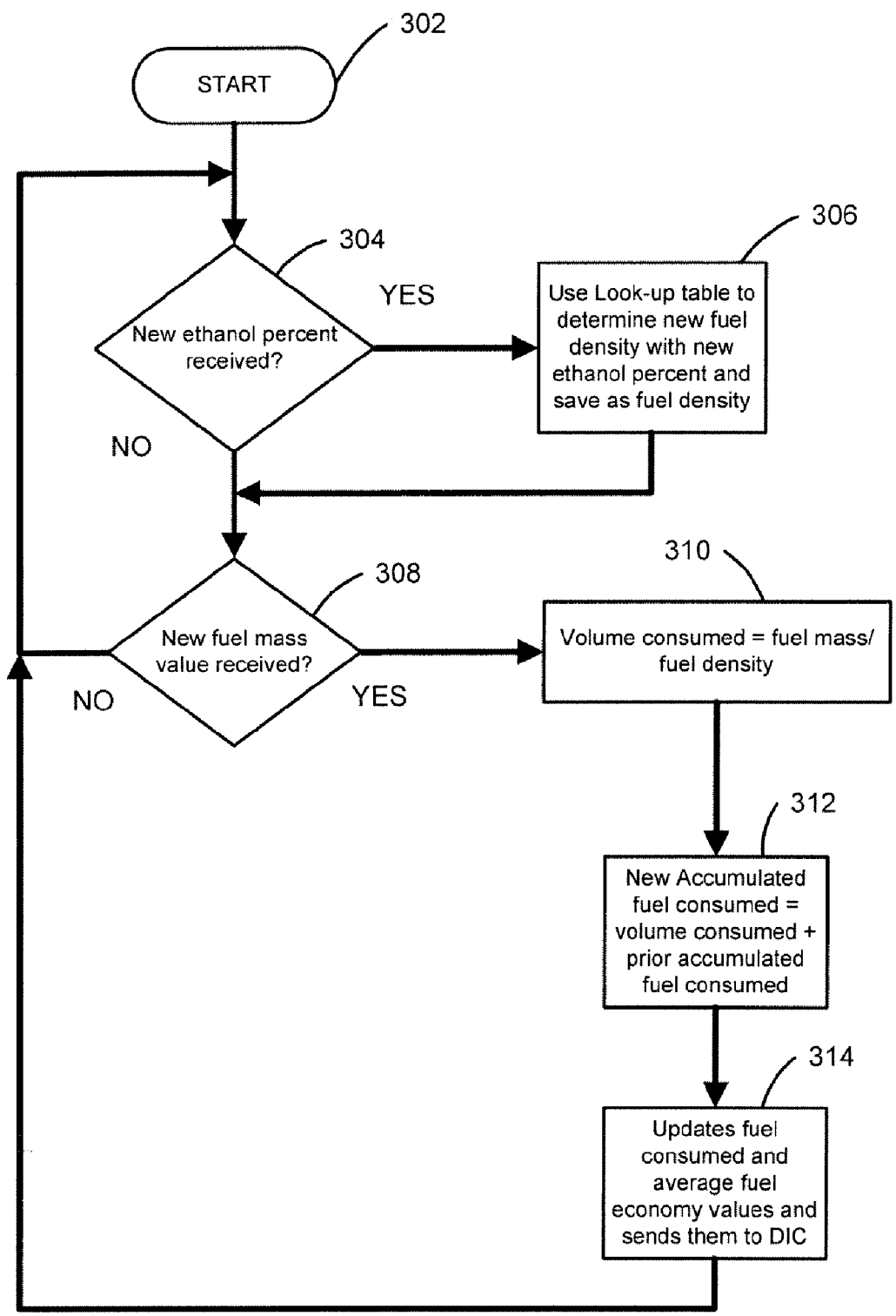
FIG. 3 is a flow diagram of a method for providing an improved consumption of fuel calculation according to the present disclosure.

Referring now to FIG. 3, a flowchart depicts a method 300 for calculating an alcohol compensated volume of fuel consumed. Method 300 can be implemented as a computer program that is stored in a computer memory associated with a computer. The computer and computer memory may be included in the engine control module 30. Method 300 may run periodically each time the engine is started. In one example, the method 300 runs every 100 msec while the engine is operating.

Control begins in start block 302 and proceeds to decision block 304. In decision block 304, control determines whether a new alcohol percent value has been received. If a new alcohol percent value has been received, control proceeds to block 306. If a new alcohol percent value has not been received, control proceeds to decision block 308.

In block 306, control uses a look-up table and determines a new fuel density value based on the new alcohol percent value and an updated fuel density value is stored. After completing block 306 control proceeds to decision block 308. In decision block 308 control determines whether a new fuel mass value has been received. If a new fuel mass value has been received, control proceeds to block 310. If a new fuel mass value has not been received, control proceeds to block 304.

In block 310, control calculates a volume of fuel consumed value by dividing the new fuel mass value by the stored fuel density value. After completing block 310 control proceeds to block 312. In block 312, control adds the volume of fuel consumed value calculated in block 310 to an accumulated fuel consumed value to determine a new accumulated fuel consumed value. After completing block 312 control proceeds to block 314. In block 314 control takes the latest volume of fuel consumed value from block 310 and the updated accumulated fuel consumed value and generates the updated fuel consumed value and an average fuel economy value that are then transmitted to the DIC 52.

What is claimed is:

1. An engine control module, comprising:
   an alcohol percent module that determines an alcohol percent in a fuel;
   a fuel mass module that determines a mass of said fuel; and
   a fuel volume module that calculates a first volume of said fuel based on said mass, said alcohol percent and a density of said fuel.

2. The engine control module of claim 1 wherein said alcohol is ethanol.

3. The engine control module of claim 1 wherein said fuel mass is measured directly.

4. The engine control module of claim 1 wherein said fuel mass is estimated.

5. The engine control module of claim 1 wherein said alcohol percent is measured directly.

6. The engine control module of claim 1 wherein said alcohol percent is estimated.

7. The engine control module of claim 1 wherein said fuel density is determined by accessing a look-up table, correlating said fuel density with said alcohol percent.

8. The engine control module of claim 1 wherein said first volume of said fuel is calculated by dividing said mass by said density of said fuel.

9. The engine control module of claim 1 wherein said fuel volume module adds said first fuel volume to a second fuel volume, that generates a sum of said first and second fuel volumes, and that generates a first updated value indicating fuel consumed and a second updated value indicating an average fuel economy based on said first fuel volume and said sum of said first and second fuel volumes.

10. The engine control module of claim 2 wherein said fuel volume module communicates said fuel consumed and average fuel economy values to a Driver Information Center.

11. A method of measuring an alcohol compensated volume of fuel consumed in an engine, said method comprising:
  determining a mass of fuel consumed by said engine;
  determining an alcohol percent in said fuel; and
  calculating a first volume of said fuel based on said fuel mass, said alcohol percent, and a density of said fuel.

12. The method of claim 11 wherein said first fuel volume is added to a second volume of said fuel that is an accumulated volume of said fuel; wherein a fuel consumed value and an average fuel economy value are generated based on said first fuel volume and said second fuel volume.

13. The method of claim 11 wherein said alcohol is ethanol.

14. The method of claim 11 wherein said fuel mass is measured directly.

15. The method of claim 11 wherein said fuel mass is estimated.

16. The method of claim 11 wherein said fuel percent is estimated.

17. The method of claim 11 wherein said fuel percent is measured directly.

18. The method of claim 11 wherein calculating a first volume includes dividing said fuel mass by said density of said fuel.

* * * * *